US009646435B2

(12) United States Patent
Outwater et al.

(10) Patent No.: US 9,646,435 B2
(45) Date of Patent: May 9, 2017

(54) METHOD AND APPARATUS FOR FINDING AND ACCESSING A VEHICLE FUELING STATION, INCLUDING AN ELECTRIC VEHICLE CHARGING STATION

(75) Inventors: Christopher Scott Outwater, Santa Barbara, CA (US); William Gibbens Redmann, Glendale, CA (US)

(73) Assignee: Liberty PlugIns, Inc., Santa Barbara, CA (US)

( * ) Notice: Subject to any disclaimer, the term of this patent is extended or adjusted under 35 U.S.C. 154(b) by 0 days.

(21) Appl. No.: 13/429,439

(22) Filed: Mar. 26, 2012

(65) Prior Publication Data
US 2012/0191242 A1 Jul. 26, 2012

Related U.S. Application Data

(63) Continuation-in-part of application No. PCT/US2011/026781, filed on Mar. 2, 2011.
(Continued)

(51) Int. Cl.
*G06F 17/00* (2006.01)
*G07C 9/00* (2006.01)
(Continued)

(52) U.S. Cl.
CPC ...... *G07C 9/00103* (2013.01); *B60L 11/1816* (2013.01); *B60L 11/1824* (2013.01); *B60L 11/1846* (2013.01); *B60L 11/1848* (2013.01); *G06Q 10/02* (2013.01); *G06Q 20/045* (2013.01); *G06Q 20/32* (2013.01); *G06Q 20/322* (2013.01); *G06Q 20/3223* (2013.01); *G06Q 20/3829* (2013.01); *G06Q 20/38215* (2013.01); *G06Q 30/06* (2013.01); *G06Q 50/06* (2013.01); *G07C 9/00007* (2013.01);

*G07C 9/00119* (2013.01); *G07F 5/26* (2013.01); *G07F 15/005* (2013.01); *H04L 9/3247* (2013.01); *H04L 9/3263* (2013.01); *H04L 9/3268* (2013.01); *H04L 63/0428* (2013.01); *H04L 63/0442* (2013.01); *H04M 1/7253* (2013.01); *B60L 2230/40* (2013.01); *B60L 2240/622* (2013.01); *B60L 2240/72* (2013.01); *B60L 2240/80* (2013.01);
(Continued)

(58) Field of Classification Search
CPC . G07C 9/00103; Y02T 90/12; B60L 11/1846; B60L 11/1848
USPC .................................................. 700/236, 237
See application file for complete search history.

(56) References Cited

U.S. PATENT DOCUMENTS 5,890,520 A * 4/1999 Johnson, Jr. ..................... 141/94
6,070,156 A * 5/2000 Hartsell, Jr. .................. 705/413
(Continued)

*Primary Examiner* — Michael K Collins
(74) *Attorney, Agent, or Firm* — John R. Kasha; Kelly L. Kasha; Kasha Law LLC

(57) ABSTRACT

A control system and method are provided for a station to dispense fuel to a vehicle, including an electric vehicle, without requiring dedicated access to a communications network, with the advantage that authorization for fleet vehicles or individuals can be obtained from an access management system, using a portable, wireless device, such as a smart phone or a dashboard appliance. The authorization is wirelessly relayed to the station by the wireless device, to enable the dispensing of fuel. Subsequently, a log comprising the transaction is provided to the access management system, through the same or a different wireless, mobile computing device. The log may also report status and other events, such as load shedding.

2 Claims, 11 Drawing Sheets

Related U.S. Application Data

(60) Provisional application No. 61/309,813, filed on Mar. 2, 2010.

(51) Int. Cl.

| | | |
|---|---|---|
| *G06Q 20/04* | (2012.01) | |
| *G06Q 20/32* | (2012.01) | |
| *G06Q 20/38* | (2012.01) | |
| *G06Q 30/06* | (2012.01) | |
| *G07F 5/26* | (2006.01) | |
| *G07F 15/00* | (2006.01) | |
| *H04L 9/32* | (2006.01) | |
| *H04L 29/06* | (2006.01) | |
| *B60L 11/18* | (2006.01) | |
| *G06Q 10/02* | (2012.01) | |
| *G06Q 50/06* | (2012.01) | |
| *H04M 1/725* | (2006.01) | |

(52) U.S. Cl.
CPC ....... *B60L 2250/10* (2013.01); *H04L 2209/56* (2013.01); *H04L 2209/80* (2013.01); *H04L 2209/84* (2013.01); *Y02T 10/7005* (2013.01); *Y02T 10/7088* (2013.01); *Y02T 10/7291* (2013.01); *Y02T 90/12* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 6,338,008 | B1* | 1/2002 | Kohut et al. | 700/237 |
| 7,141,321 | B2* | 11/2006 | McArthur et al. | 429/443 |
| 7,565,307 | B1* | 7/2009 | Pinkus | 705/16 |
| 2003/0090363 | A1* | 5/2003 | Ogura | B60L 11/1824 340/5.4 |
| 2004/0110044 | A1* | 6/2004 | McArthur et al. | 429/13 |
| 2004/0189493 | A1* | 9/2004 | Estus et al. | 340/988 |
| 2005/0000802 | A1* | 1/2005 | Hobbs | 204/277 |
| 2006/0206433 | A1* | 9/2006 | Scoggins | G01D 4/004 705/63 |
| 2007/0276681 | A1* | 11/2007 | Moore | 705/1 |
| 2008/0040287 | A1* | 2/2008 | Harrell et al. | 705/71 |
| 2009/0234599 | A1* | 9/2009 | Watanabe | B60L 11/1816 702/63 |
| 2010/0204865 | A1* | 8/2010 | Nakamura | 701/22 |
| 2011/0140656 | A1* | 6/2011 | Starr et al. | 320/109 |
| 2011/0202418 | A1* | 8/2011 | Kempton et al. | 705/26.1 |
| 2011/0213983 | A1* | 9/2011 | Staugaitis | B60L 11/1824 713/176 |
| 2012/0109798 | A1* | 5/2012 | Shelton et al. | 705/34 |
| 2012/0116955 | A1* | 5/2012 | Prosser et al. | 705/39 |
| 2012/0191242 | A1* | 7/2012 | Outwater et al. | 700/236 |

\* cited by examiner

700

701 <SecureCertificate>
710 <CertificateID>33333333-3333-3333-3333-333333333333</CertificateID>
711 <IssueDate>13-Feb-2012 09:56:14</IssueDate>
712 <ChargerID>11111111-1111-1111-1111-111111111111</ChargerID>
713 <ChargerCommID>01:0E:07:75:B7:12</ChargerCommID>
714 <ReservationDate>14-Feb-2012 20:15:00</ReservationDate>
715 <ReservationEndDate>15-Feb-2012 00:15:00</ReservationEndDate>
702 </SecureCertificate>
703 <SignatureValue>A4565874 559E981D 5140609A BBC7D529</SignatureValue>

721 <SecureCertificate>
730 <CertificateID>44444444-4444-4444-4444-444444444444</CertificateID>
731 <IssueDate>12-Feb-2012 19:24:08</IssueDate>
732 <ExpiresDate>15-Feb-2012 19:24:08</ExpiresDate>
722 </SecureCertificate>
723 <SignatureValue>ADCD51BA 687A8BB0 D43CAFD8 403F4D32</SignatureValue>

FIG. 7B

```
801 ─╲<SecureLog>                                                          ╱800
    811 ─╲<ChargerID>11111111-1111-1111-1111-111111111111</ChargerID>
    812 ─╲<LogDate>17-Feb-2012 07:48:13</LogDate>
    813 ─╲<PrevAck>
        814 ─╲<AckID>22222222-2222-2222-2222-222222222222</AckID>
        815 ─╲<AckReceivedDate>14-Feb-2012 20:24:39</AckReceivedDate>
        </PrevAck>
    820 ─╲<StatusList>
        821 ─╲<Status>
            822 ─╲<StatusDate>16-Feb-2012 19:54:43</StatusDate>
            823 ─╲<Battery>OK</Battery>
            824 ─╲<Temp>22</Temp>
        829 ─╲</Status>
    830 ─╲</StatusList>
        <EventList>
            <Event>
    840 ─╱    <SeqNumber>04568</SeqNumber>
        841 ─╱<Date>14-Feb-2012 20:24:40</Date>
        842 ─╱<CertificateID>33333333-3333-3333-3333-333333333333</CertificateID>
        843 ─╱<StopDate>14-Feb-2012 23:57:22</StopDate>
            844 ─╱<WattHours>14463</WattHours>
    845 ─────    </Event>
            <Event>
    850 ─╱    <SeqNumber>04569</SeqNumber>
        851 ─╱<Date>15-Feb-2012 06:49:12</Date>
        852 ─╱<CertificateID>44444444-4444-4444-4444-444444444444</CertificateID>
        853 ─╱<StopDate>15-Feb-2012 15:12:17</StopDate>
            854 ─╱<WattHours>20284</WattHours>
    855 ─────    </Event>
            <Event>
    860 ─╱    <SeqNumber>04569</SeqNumber>
        861 ─╱<Date>15-Feb-2012 14:15:03</Date>
        862 ─╱<LoadShed/>
        863 ─╱<StopDate>15-Feb-2012 14:45:04</StopDate>
    864 ─────    </Event>
            <Event>
    870 ─╱    <SeqNumber>04570</SeqNumber>
        871 ─╱<Date>16-Feb-2012 06:45:30</Date>
        872 ─╱<CertificateID>55555555-5555-5555-5555-555555555555</CertificateID>
        873 ─╱<StopDate>16-Feb-2012 15:06:20</StopDate>
            874 ─╱<WattHours>19938</WattHours>
    875 ─────    </Event>
    839 ─╲    </EventList>
802 ─╲</SecureLog>
803 ─╲<SignatureValue>294727A9 38BB1C36 48EF813F FC9D158B</SignatureValue>
```

FIG. 8

```
1001──<SecureLogAcknowledgement>                                              1000
          <AckID>22222222-2222-2222-2222-222222222222</AckID>
   1010──<IssueDate>13-Feb-2012 09:56:14</IssueDate>
   1011──<ChargerID>11111111-1111-1111-1111-111111111111</ChargerID>
   1012──<SeqNumber>04567</SeqNumber>
   1013──/
1002──</SecureLogAcknowledgement>
1003──<SignatureValue>2BC42C48 11D79660 4F58F5D0 DFB00051</SignatureValue>
```

FIG. 10A

```
1021──<SecureLogAcknowledgement>                                              1020
          <AckID>777777-7777-7777-7777-77777777</AckID>
   1030──<IssueDate>13-Feb-2012 09:56:14</IssueDate>
   1031──<AckList>
   1032── 1040──<Ack>
             1041──<ChargerID>111111-1111-1111-1111-11111111</ChargerID>
             1042──<SeqNumber>04567</SeqNumber>
                   </Ack>
          1050──<Ack>
             1051──<ChargerID>888888-8888-8888-8888-88888888</ChargerID>
             1052──<SeqNumber>16321</SeqNumber>
                   </Ack>
          1060──<Ack>
             1061──<ChargerID>99999999-9999-9999-9999-999999999999</ChargerID>
             1062──<SeqNumber>00315</SeqNumber>
                   </Ack>
   1033──</AckList>
1022──</SecureLogAcknowledgement>
1023──<SignatureValue>8D3C3A8F D9B0B1E1 CB6D092D 28A0AB46</SignatureValue>
```

FIG. 10B

METHOD AND APPARATUS FOR FINDING AND ACCESSING A VEHICLE FUELING STATION, INCLUDING AN ELECTRIC VEHICLE CHARGING STATION

CROSS REFERENCE TO RELATED APPLICATIONS

The present application is a continuation-in-part of International Patent Application PCT/US11/26781, filed Mar. 2, 2011, which claims benefit to U.S. Provisional Patent Application No. 61/309,813, filed Mar. 2, 2010, each of which is incorporated herein by reference in their respective entireties.

FIELD OF THE INVENTION

The present invention relates generally to a system and method for controlling access to a vehicle fueling station. More specifically, the present invention relates to a system and method for finding and accessing a vehicle refueling station, of which an electric vehicle charging station is an example.

BACKGROUND OF THE INVENTION

A drawback that inhibits wide adoption of electric vehicles is the lack of infrastructure for conveniently charging them; and while hybrid electric vehicles are increasingly popular, plug-in versions that operate to maximize use of their battery and minimize use of their gasoline-fueled generator are rare, in part due to the same lack of pervasive infrastructure.

Provision of a vehicle charging infrastructure is inhibited by complexity: Such infrastructure is expensive, typically requiring not only provision of power, but also of communication services that (if and when available) represent an ongoing operational expense. In some cases, wired communication channels can be used to allow a charging station to communicate with external systems, for example, a merchant bank for clearing credit and debit card transactions. However, that suggests a pervasive communications infrastructure for every charging station. While wireless technologies can be employed for such communication channels in some circumstances, in some cases they are difficult to configure and make reliable, for example, in subterranean parking structures and some city streets where the positions of vans and trucks might screen a transceiver from a communication signal. Such wireless communications may be expensive. Other efforts to provide communication through the power grid require extensive, pervasive, and expensive changes to the grid itself, in order to make such communication available wherever needed.

While the need to address these issues with respect to electric vehicle charging has generated the following solution, the solution itself is more generally applicable, for example to other forms of vehicle fueling.

OBJECTS AND SUMMARY OF THE INVENTION

The present invention relates generally to a system and method for refueling vehicles. More specifically, the present invention relates to a system and method for finding and accessing a fueling station for vehicles, including an electric vehicle charging station. That is, the present invention makes identifying an appropriate fueling station easier and more efficient, can provide a parking and reservation system (most pertinent to EV charging stations), and mediate access between a vehicle's on-board communications system or user's smart phone and a fueling station.

Presently, facility owners wishing to provide electrical vehicle charging stations need to identify a location to be reserved for vehicle recharging, provide electric service to that location, and install Electric Vehicle Service Equipment (EVSE, that is, a charger or charging station). If they choose to require payment for the electricity used to charge the vehicle, typical installations require communication also be provided. In the case of equipment located near communications closets in parking structures this is easier, as it is if the parking is in the open air or other area well served by long range wireless technology, such as cell phone coverage or Wi-Fi. But wireless connections can be tenuous, potentially being attenuated by a parked truck or completely absent in an underground parking facility.

There is a further need to provide such fueling infrastructure in a manner that can minimize labor and materials costs, maintains reliability, and is arbitrarily scalable.

Further still, there is a need to permit such installations to operate on an individual basis, without a requirement that an entire infrastructure have first been converted to a new standard. This is particularly true for communication-over-power line systems that require not only bridging of communications over power lines at charging equipment, but also at every breaker panel and transformer between the charging station and the gateway to pre-existing communications channels. Failing implementation of a comprehensive data-over-power line infrastructure, support for such communication will be spotty, potentially for decades.

Further, there is a need for such fueling infrastructure to facilitate finding a location with a minimum of difficulty and delay, and ideally, in a way that maximizes convenience and confidence, for example, by supporting reservations for parking and charging, which can be especially valuable for electric vehicle recharging.

The present invention satisfies these and other needs and provides further related advantages.

Herein, the term "charging station" includes Electric Vehicle Supply Equipment (EVSE), as the charging stations for modern electric vehicles are formally known in standards such as the Society of Automobile Engineers (SAE) standard J1772:2010 for their Electric Vehicle and Plug-in Hybrid Electric Vehicle Conductive Charge Coupler. Further, while the discussion herein is presented in the context of an electric vehicle and uses charging stations as the primary example, the teachings herein for an access management system apply to a more general "dispensing station" for vehicles, a term used herein to encompass not only charging stations, but also other fueling stations, such as for gasoline or compressed natural gas (CNG).

The term "access management system", as used herein, includes "parking management system", as might be used by parking lot owners to administer access to the parking spaces, lots, or areas they manage and the charging stations located therein. The term also applies to "fleet management systems", which administer access to fueling stations for the vehicles of their fleets. The term also applies to "fueling station management systems", for example as might be owned by an oil company, to control access for individuals to fueling stations operated or managed by the company. Herein, the main example embodiment is of electric vehicle charging stations managed by a parking management system, and these terms will be encountered most often, but the invention is applicable to any of these access management systems.

It is an object of the present invention to provide a way for a management system to monitor the status of, and control access to, a fuel dispensing station for vehicles, which may be a charging station for electric vehicles, where the management system can remote from, and may have no real-time communication with, the dispensing station.

It is an object of the present invention to provide control through a wireless, mobile computing device, such as a smart phone, or an in-vehicle dashboard appliance.

It is an object of the present invention for a wireless, mobile computing device to carry authorizations from the management system to the dispensing station.

It is an object of the present invention for a wireless, mobile computing device to carry transaction records from the dispensing station to the management system.

It is an object of the present invention for a wireless, mobile computing device to carry status records from the dispensing station to the management system.

It is an object of the present invention for a wireless, mobile computing device to carry receipt acknowledgments for log records from the management system to the dispensing station.

It is an object of the present invention for a wireless, mobile computing device to carry software upgrades or policy updates from the management system to the dispensing station.

It is an object of the present invention for a first dispensing station to exploit a communication connection with a second dispensing station to facilitate communication between the first dispensing station and the management system.

It is an object of the present invention to provide a software application for a smart phone or a dashboard appliance to facilitate communication between a management system and a dispensing station.

It is an object of the present invention to facilitate the finding of an available and ready dispensing station, including the finding of a particular dispensing station.

It is an object of the present invention to allow any of the communications between the management system and the dispensing station to be secure and/or authenticable.

It is an object of the present invention to permit the assignment of a particular dispensing station in response to a request for access to a dispensing station.

It is a primary object of the present invention to minimize costs of installing a fueling infrastructure, such as for electrical vehicle charging, while providing a convenient, robust, and secure user experience for operators and patrons of the system.

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which:

FIGS. 7A and 7B are example parking certificate files;

FIG. 8 is an example log data file compiled by a charging station to be transferred to a smart phone or otherwise communicated;

FIGS. 10A and 10B are example acknowledgment files to be communicated to a charging station; and, FIG. 11 is an example block diagram for a charging station of the present invention.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

Figure 1:
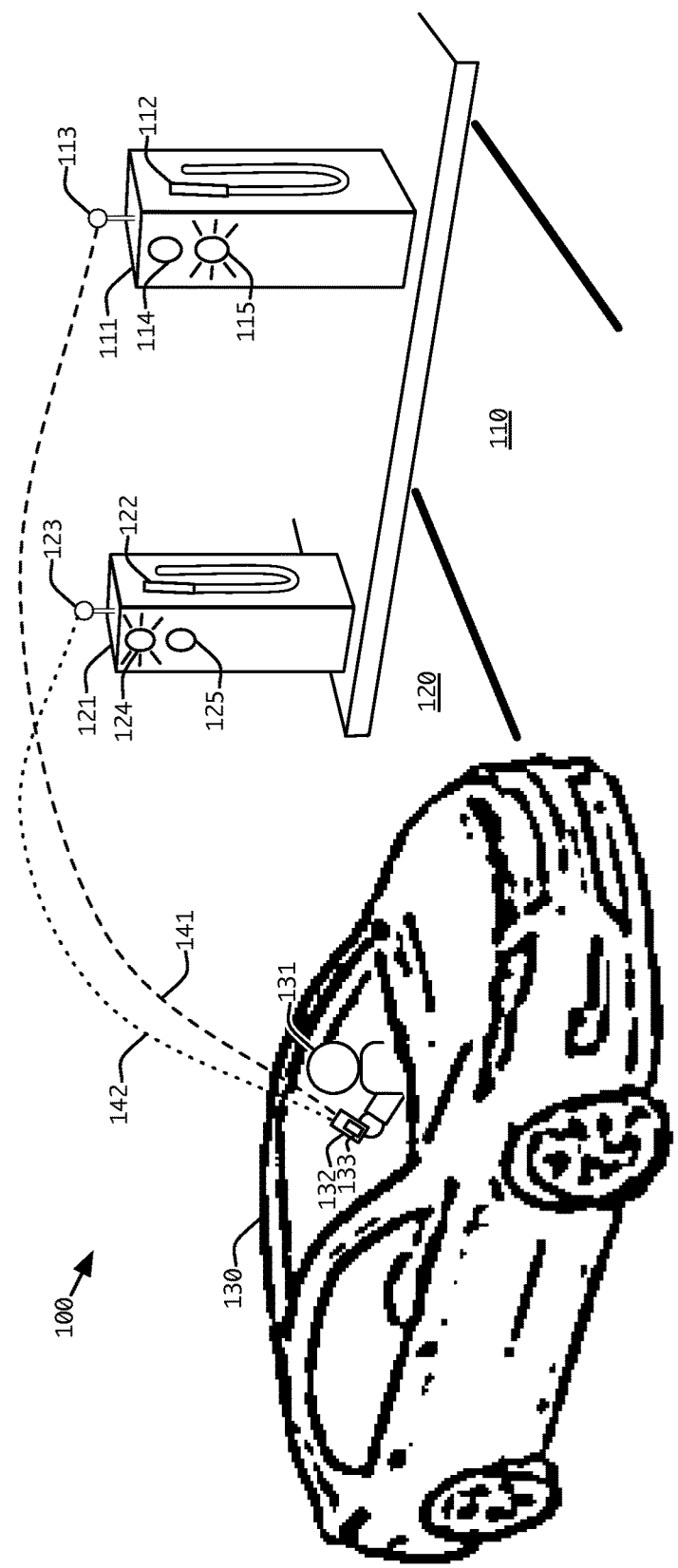
FIG. 1 illustrates an electric vehicle approaching multiple charging stations.

Referring to FIG. 1, in approach situation 100, plug-in electric vehicle 130, which may be a plug-in hybrid electric vehicle, approaches parking spaces 110, 120, served by chargers 111, 121, respectively. Each charger 111, 121, is equipped with a charge cable 112, 122, terminated with a standard connector, for example, one manufactured in accordance with the Society of Automotive Engineers standard SAE J1772:2010.

In the present invention, as patron 131 approaches parking spaces 110, 120 in vehicle 130, a wireless, mobile computing device 132 communicates with chargers 111, 121. Wireless, mobile computing device 132 may be a smart phone, carried by patron 130, or a "dashboard appliance" carried by vehicle 130, such as a removable GPS navigation device or onboard electronics module integrated into the vehicle, configured, for example by application 133, to carry out the communications and transactions described herein. In many of the embodiments discussed, wireless device 132 is described as a "smart phone" running application 133 for illustrative reasons, but it should be understood that these other embodiments might be used instead in many of the example embodiments.

Each charger 111, 121 has an antenna 113, 123 and one or more communication modules (shown in FIG. 11) with which to carry out an interaction with smart phone 132. Generally, wireless communication could be provided as optical, radio, infrared, or acoustic communication. However, for this application, radio communication is practical, and use of the internationally approved Industrial, Scientific, and Medical (ISM) bands is well suited, in particular the 2.4 GHz band, which is used by the example radio communications standards identified herein.

Smart phone 132 forms a wireless connection 142 with charger 121, in one example embodiment using Bluetooth®, (as described by Bluetooth SIG, Inc. of Kirkland, Wash. and published by them as the "Bluetooth Specification Version 4.0", Jun. 30, 2010 and previous versions). When this happens, the transaction results in charger 121 indicating that parking space 120 is not available for vehicle 130. Example details for such a transaction are discussed below in conjunction with FIGS. 3-6. This indication may be made by a visible or audible signal made with smart phone 132, or it may be indicated by charger 121, for example by lighting or flashing red light 124 (while green light 125 is unlit).

Smart phone 132 forms wireless connection 141 with charger 111, again by example, using Bluetooth® or other wireless communication mechanism and protocol. When this happens, the transaction results in charger 111 indicating that parking space 110 is available either generally or specifically for vehicle 130. Again, example details are discussed below in conjunction with FIGS. 3-6. This indication may be made by a visible or audible signal made with smart phone 132, or by charging station 111 lighting or flashing green light 115 (while red light 114 remains unlit).

In this way, patron 131 is directed toward parking spaces available for use by vehicle 130. Absent the presence of smart phone 132 and wireless connections 141, 142, charger 121 would indicate "No Parking" with red light 124, and, if parking space 110 is generally available, charger 111 may continue to indicate "Parking Available" with green light 115, but if parking space 110 is specifically reserved for patron 131 or vehicle 130 (or wireless device 132), then red light 114 would be lit to indicate "No Parking" until vehicle 131 approaches and the above transaction is conducted over wireless connection 141.

Figure 2:
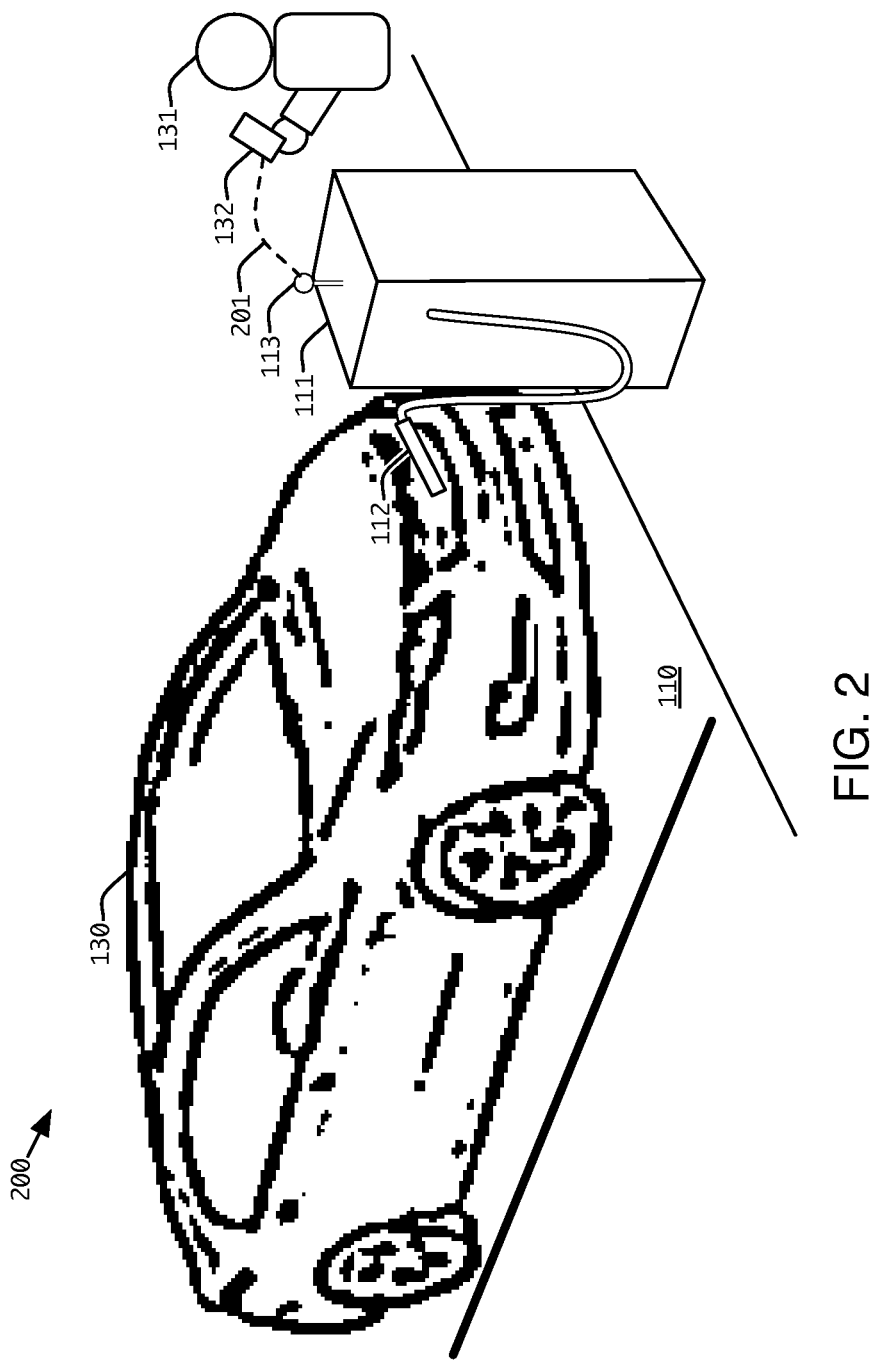
FIG. 2 illustrates an interaction between a patron and/or vehicle with a charging station.

Turning to FIG. 2, parked situation 200 is shown, where electric vehicle 130 has parked in parking space 110 and has been connected for charging from charging station 111 through charging cable 112. Note that in some embodiments, the connection for charging may be inductive (not shown). In some embodiments, while in parking situation 200, charger 111 may be enabled by interaction with smart phone 132 through antenna 113 and wireless connection 201. Wireless connection 201 may be the same as connection 141, e.g., Bluetooth®, or may be a different wireless connection, e.g., near field communication (NFC), or may include both. One example using NFC is discussed in conjunction with FIG. 4. In another embodiment, smart phone 132 may use a camera or other sensor (not shown) to read a barcode or other indicia (not shown) on or proximal to charging station 111 instead of an alternative wireless connection differing from connection 141. Such an embodiment is further discussed in conjunction with FIG. 5.

After an interval of time parking in space 110, as patron 131 returns, smart phone 132 may again form wireless connection 201 with charging station 111 to complete the charging transaction, and/or download information about the charging session. This may occur before or after electric vehicle 130 is disconnected from charge cable 112, and if before, may disable the charging station. Example information that might be downloaded to smart phone 132 may be an electronic receipt detailing the amount of energy drawn in the charging session, a billing amount, or other information such as whether the charging station 111 was a target of a load shed event during the charging session, or whether maintenance is required.

Figure 3:
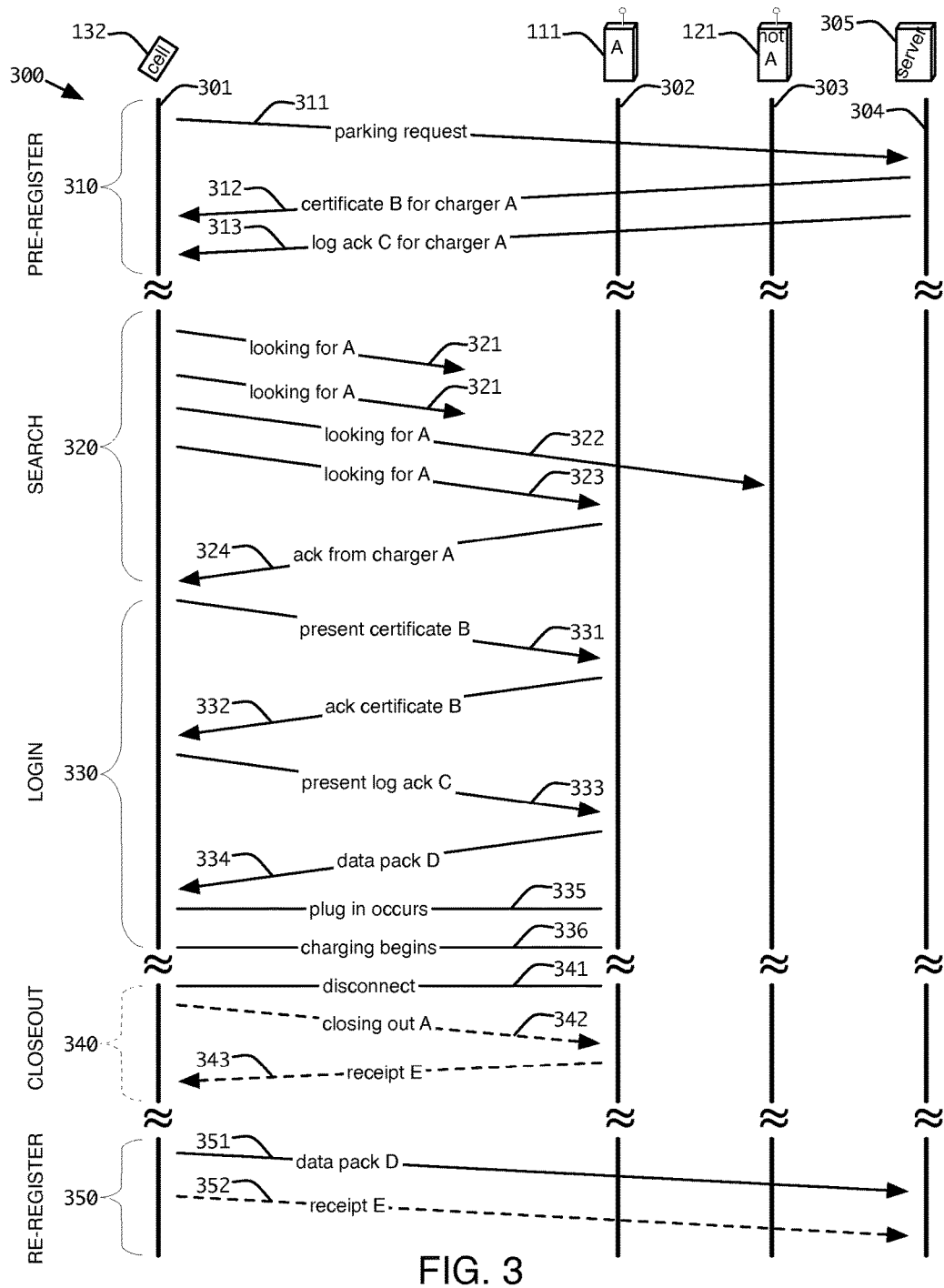
FIG. 3 is a diagram showing a transaction sequence between a wireless device (e.g., a smart phone), an authorizing server, and multiple charging stations.

FIG. 3 shows a detailed transaction diagram for an assigned parking transaction sequence 300 occurring between smart phone 132 and a parking management system, represented by parking management server 305, and charging stations 111 (also called 'A'), and 121.

The vertical lines 301, 302, 303, and 304 correspond to smart phone 132, charger station 111, charger station 121, and parking management server 305, with the many arrows among them (e.g. 311) representing messages sent by the entity from which the arrow points away and being sent to the entity toward which the arrow points. So, the initial transaction 311, in pre-registration phase 310 of assigned parking transaction sequence 300 is a request for parking from smart phone 132 to server 305. Such a request might be made with an application 133 on smart phone 132 able to contact server 305 via the cell phone network (not shown) to request parking and charging immediately, or for a reservation at some specified time and date in the future. The request may include an account ID or payment information (depending on the business policy being implemented), and may include secure credentials (e.g., password) for authorization. The request may include a specification of where the parking is to be (e.g., in what parking facility), or may merely indicate the general location (in which case, other patron-specified optimizations such as minimizing cost or walking distance, may be provided). In another embodiment, the connection to parking management server 305 may be through a connection at a parking access gate (not shown), such that request 311 occurs as the vehicle 130 is at the entrance to the parking lot comprising spaces 110, 120. In such an embodiment, the request for a parking space with a charging station is effectively for immediate occupancy. Note that transaction 311 must occur from a location where smart phone 132 can obtain a connection to server 305. As such, in some embodiments, parking request 311 and the responses may be exchanged through a wired connection (e.g., while at home, through the Internet), rather than using a wireless connection.

In response to parking request 311, parking management server 305 replies with a certificate B (in message 312) for specific charger A (in this example, charging station 111). Server 305 may further reply with log acknowledgment C (in message 313), a data file, also specifically for charger A. The use of the log acknowledgment C is discussed below in conjunction with FIGS. 10A, 10B and elsewhere, but its purpose is to let parking station 111 know what fraction of the logs kept by parking station 111 have been successfully transferred to parking management server 305, and can therefore be deleted. Both certificate B (in 312) and log acknowledgment C (in 313) should be digitally signed for security using a signing certificate (not shown) trusted by charger A. Example embodiments of these two messages are discussed below in conjunction with FIGS. 7A and 10A.

During search phase 320, smart phone 132 may make unsuccessful attempts to find charger A (111), for example with unacknowledged "looking for A" messages 321.

In an example embodiment using Bluetooth® as the wireless communication channel for connections such as 141, 142, then certificate B for charger A may comprise the Bluetooth Device Address (BD_ADDR) for charger A. Thus, in a Bluetooth® embodiment, the search for charger A may comprise either repeated page messages directed for the device address (BD_ADDR) corresponding to charger A.

If using page messages directed at charger A, then message 322, even when actually received by another charger (e.g., 121), the other charger will not respond.

When "looking for A" message 323 is actually received by charger A (111), an acknowledgment message 324 from charger A will be returned to smart phone 132: Charger A has been located. In one example embodiment, when "looking for A" message 323 is acknowledged, charger A (111) may start flashing a green indicator 115.

In an alternative embodiment, "looking for A" messages 321, 322, 323, might be Bluetooth® inquiry messages, which chargers 111, 121 might both acknowledge with their respective devices addresses (BD_ADDR). Application 133 would then look for the device address of charger A in the inquiry responses received. The other charger's response (not shown in FIG. 3) will not include charger A's device address, and so may be ignored.

During login phase 330, certificate message 331 is sent by smart phone 132 to charger A thereby providing certificate B to charger A. Certificate B conveys to charger A the presenter's rights (e.g., charging for a particular interval). Certificate B can be securely trusted by charger A when the certificate is digitally signed by server 305 using a signing certificate that charger A trusts.

If charger A (111) accepts certificate B, for example because it recognizes the signing authority of server 305 and the certificate is current, then an acknowledgment message 332 is returned.

Smart phone 132 may present the log acknowledgment C obtained from server 305, if any, to charger A (111) through message 333, which charger 111 may acknowledge (not shown).

Charger 111 may present data pack D to smart phone 132 in message 334, which smart phone 132 may acknowledge (not shown). Data pack D may comprise any of status information about charger 111, transaction data concerning the current and previous interactions, usage data concerning previous interaction (there has been no usage associated with the current transaction as yet), and other events (e.g., load shed and maintenance events). An example embodiment for data pack D is shown in FIG. 8 and discussed below. To be secure, data pack D should be digitally signed by charger A (111) using a signing certificate recognized by server 305. In an alternative example, data pack D may be encrypted, using a private key for charger 111 for which server 305 knows the public key. In either example case, server 305 can securely trust that charger 111 originated data pack D, which has not be subjected to tampering.

At 335, vehicle 130 is plugged into charger 111 and charging begins at 336. The log acknowledgment message 333 and data pack message 334 and plug-in event 335 may occur in any order after the acknowledgment message 324 from charger A; however, the start of charging (336) will not occur until a certificate is presented 331 and plug-in has occurred (336).

Typically, patron 131 will leave the proximity of vehicle 130 for a substantial portion of the charging interval. Upon return, the closeout phase 340 begins, comprising at least the disconnection of vehicle 130 from charger 111. Optionally, patron 131 may use smart phone 132 and resume application 133 to send a close out message 342 to charger A (111), to which charger A may respond with message 343 containing receipt E. In some embodiments, the receipt may be replaced with or be a portion of an updated data pack, similar to that in message 334, but including details of the patron's just-concluded charging session.

Subsequently, smart phone 132 is able to send message 351 containing data pack D to server 305. Likewise, if available, message 352 containing receipt E may be sent. In some embodiments, smart phone 132 may send messages 351, 352 as soon as wireless connection to server 305 is obtained, for example, if application 133 remains active. In some embodiments, these messages may be embedded in outbound emails or format suitable for other messaging or notification systems, such that they can be queued before the application 133 terminates, and for sending by the operating system when the opportunity arises.

A key element of the present invention is that the operation does not rely on the smart phone 132 of patron 131 to report receipt E to server 305. If that happens, server 305 receives that information sooner. What the operation does rely on is that eventually, some smart phone will upload data pack D (or a more current version of it), so that all intervening transactions and operational data will ultimately be reported, even if redundantly, and thus, provides a robust reporting method.

Smart phone 132 is eventually expected to use process 300, or other example processes described below, additional times. Thus, the latest that application 133 might be reactivated would be for entry into pre-registration phase 310, where a subsequent parking request 311 might be being made. At that time, a message like 351 containing data pack D (and optionally one like message 352 containing receipt E) may be sent. If not, or if there is a persistent absence of data pack messages from smart phone 132, then server 305 might consider smart phone 132 to have been compromised and cease to transact with it, or take other measures. In any case, some other smart phone (not shown, and not controlled by patron 131) may transact with charger 111 and server 305, and a data pack comprising similar information to that in data pack D, plus data representative of the transaction and usage that would have been reported in receipt E, may be uploaded.

Figure 4:
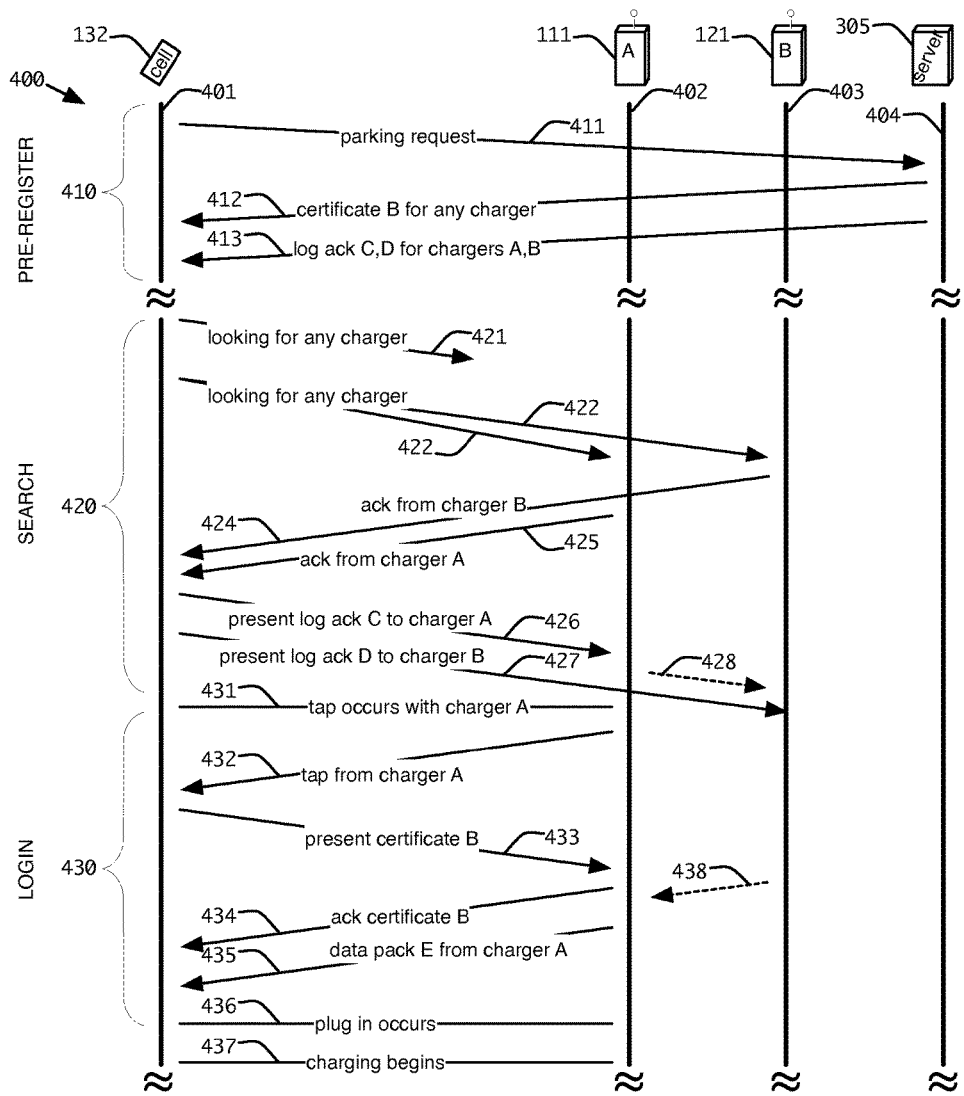
FIG. 4 is a diagram showing another embodiment of the transaction sequence.

FIG. 4 shows a detailed transaction diagram for unassigned parking transaction sequence 400, in which lines 401, 402, 403, 404 correspond to smart phone 132, charger A 111, other charger 121, and server 305, respectively. Here, pre-registration phase 410 comprises a message 411 from smart phone 132 to parking management server 305 in which parking is requested. However, in this example, the parameters of the request, or of the parking facility, do not provide for parking at a specific charger, but instead a certificate B is provided in message 412 that is good for any charger (at least, any charger that accepts server 305 as a management authority allowed to authorize parking access). Further, server 305 may provide one or more log acknowledgments, e.g., C & D, for chargers A & B, respectively.

During search phase 420, "looking for any charger" messages are sent. In one example embodiment, Bluetooth® inquiry messages may be used, again stimulating a response from any device recognizing the inquiry. This does not occur for message 421, which no device receives, but when charger 121 receives inquiry message 422, it acknowledges with message 424, and identifies itself as charger B (using its device address). Likewise, when charger A (111) receives inquiry message 422, it responds with acknowledgment message 425 and its own device address. Note that, for this embodiment, since the messages are not directed to any specific device, messages 421 and 422 could be received and acknowledged by neither, either, or both chargers 111, 121. Here, that only message 422 is received, and by both chargers 111 and 121, is just an example.

In one embodiment, upon acknowledgment of "looking for charger" message 422, each acknowledging charger may start to flash green indicators (e.g., 115, 125).

Upon receipt of acknowledgment 424 from charger B (121), log acknowledgment D may be presented to charger B via message 427.

Upon receipt of acknowledgment message 425 from charger A, log acknowledgment C may be presented to charger A via message 427. Both messages 426, 427 may be acknowledged (not shown). Embodiments using alternative communication messages 428 and 438, between stations 111 and 121, are discussed below, following the discussion of FIG. 11.

Log in phase 430 requires a short-range interaction between smart phone 132 and one charger (here, charger A, 111). The interaction must be short range so that it is unambiguous that charger 111 is the one with which smart phone 132 is interacting. One example short-range communication that may be used is the wireless "near field communication" (NFC) standard promoted by the NFC Forum, of Wakefield, Mass. With smart phone 132 being an NFC-enabled device, a tap 431 of smart phone 132 to NFC tag (not shown) on charger 111 would allow emissions from smart phone 132 to power the tag enough to send an acknowledgment 432 from the tag on charger A to smart phone 132, confirming the identify (e.g., device address) of charger A as the tapped device. Alternatively, charger A may have an NFC reader, and smart phone 132 a tag, or they may both have active NFC readers. The point of the "tap" or other short-range interaction is to identify to smart phone 132 the correct device address for the charger, or the opposite: Identify to the charger the correct device address of smart phone 132. Either way, once identities are confirmed, smart phone 132 may provide certificate B to charger A in presentation message 433 (which need not be over the NFC channel). Charger A acknowledges certificate B with message 434 and may provide data pack E in message 435. At 436, plug-in occurs and charging begins at 437.

As a variation on this embodiment, message 435 could be sent during search phase 420, after acknowledgment 425. Likewise, a message containing data pack F from charger 121 might be sent following acknowledgment 424.

The balance of the transaction sequence (e.g., closeout and re-register phases) is as in transaction sequence 300.

Figure 5:
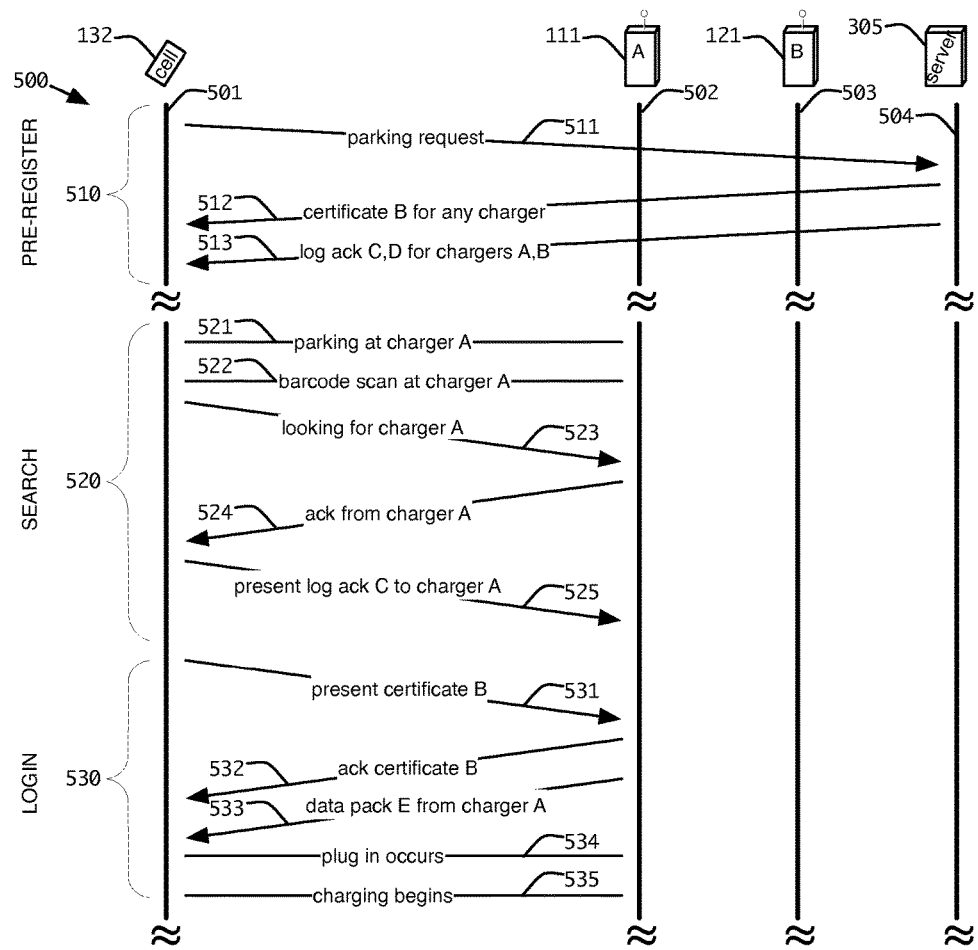
FIG. 5 is a diagram showing still another embodiment of the transaction sequence.

FIG. 5 shows a detailed transaction diagram for another unassigned parking transaction sequence 500, in which lines 501, 502, 503, 504 correspond to smart phone 132, charger A 111, other charger 121, and server 305, respectively. In pre-registration phase 510 and parking request message 511, certificate message 512, and log acknowledgment message 513 are similar to messages 411, 412, 413 in pre-registration 400. However, in search phase 520, instead of using wireless to find an appropriate charger, patron 131 is allowed to pull car 130 into any available parking spot 110, 120 for which the charger 111, 121 shows a green light 115, 125 (or at least not a red light 114, 124). In other example embodiments, patron 131 may pull into any available parking spot 110, 120. In the example shown in FIG. 5, at 521, patron 131 parks vehicle 130 in parking spot 110, corresponding to charger A (111).

At 522, patron 131 uses application 133 on smart phone 132 to scan a barcode (not shown) on charger A. For example, a two-dimensional barcode, such as the Quick-Response 'QR' codes defined in ISO/IEC 18004:2006) may be used, and may contain enough information to convey the device address (e.g., BD_ADDR) for wireless communication with charger A (111).

Having obtained the device address, smart phone 132 can issue a "looking for charger A" message 523, in the manner of FIG. 3, with the acknowledgment message 524 from charger A being the response, at which point smart phone 132 may present log acknowledgment C to charger A in message 525.

Log in phase 530 has certificate presentation message 531 delivered by smart phone 132, which is acknowledged by message 532. Charger 111 may provide data pack E in message 533. And again, plug-in event 534 is followed by the start of charging 535.

Note in this example transaction sequence that presentation of the log acknowledgment C to charger A occurred during search phase 520, rather than in the log in phase 530 after certificate B was acknowledge in message 532, as was shown in transaction sequence 300. These examples illustrate that some elements of these transactions are flexible and have a tolerance for non-strict ordering.

Figure 6:
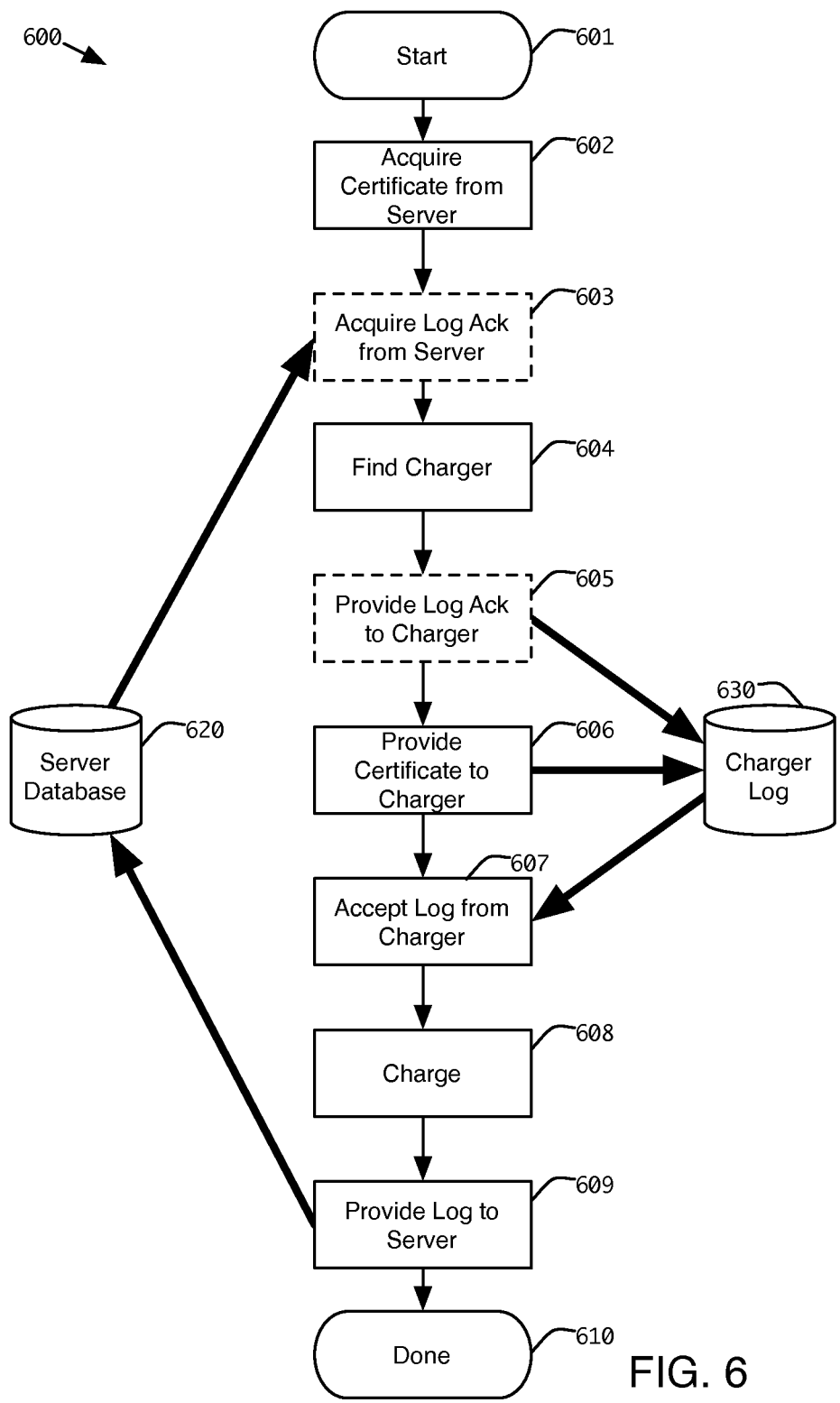
FIG. 6 is flowchart showing a process implemented by the example transaction sequences of FIGS. 3-5.

FIG. 6 shows a flowchart for an access control and reporting process 600 as performed by any of the example transaction sequences in FIGS. 3-5. At 601, the process begins when a patron 131 has a device, such as a smart phone or dashboard appliance, which is able to communicate with parking management server 305. The communication may be wireless and the communication channel permitting this communication may comprise the Internet. For convenient and clear discussion, a premise in this description is that the device is smart phone 132.

At 602, patron 131 uses smart phone 132, for example running application 133, to request electric vehicle parking and in response to the request obtains a parking authorization certificate from server 305. The request can be very specific, for example, "I need to park my EV at 123 Main St. today at noon," or much more general, "I will be parking my EV in Santa Barbara, later this week," or something in between (e.g., parking at 123 Main St., later this week). The certificate, too, may be very specific, or more general. For example, the certificate might be valid only at one specific charging station, and only for a particular interval, e.g., today from noon until 2 PM; or the certificate might be valid at any of several specific charging stations at a particular facility, again from noon until 2 PM today. Or, for some 2 hour period between noon and 5 PM, for example. Such certificates would constitute a "parking reservation". In another example, a more general certificate might be valid all week, at any charging station in the city under the management of server 305.

On some occasions, in some embodiments, at 603, while smart phone 132 is still in communication with server 305, smart phone 132 receives one or more log acknowledgment messages, each corresponding to a specific charging station. A log acknowledgment message for a charging station is derived from parking management server database 620, and indicates the most current record (or date) received from that charging station. Such a message will tell the corresponding charging station that those records have been successfully received by server 305 and need no longer be retained by the charging station, thus limiting the amount of data to be stored locally on a charger.

At 604, smart phone 132 finds and makes connection with a charger. If the parking authorization certificate is directed to a particular charging station (e.g., 111), then smart phone 132 may use wireless communication to search for that particular charging station. When found, the smart phone 132 and charging station 111 may collaborate to direct patron 131 and vehicle 130 to an appropriate parking space (e.g., 110). A broader search may be made if various charging stations would be appropriate. In cases where a wireless search results in an ambiguous situation, then additional search mechanism (e.g., NFC 431, or barcode reading 522) may be used to complete the search and identify the correct charging station.

At 605, smart phone 132 may deliver any log acknowledgment messages apropos to any charging station contacted in the search of 604. A charging station receiving an appropriate log acknowledgment message may truncate its charger log 630 in accordance with the message, provided the message can be trusted (e.g., as might be ensured by a valid digital signature from a recognized authority).

Note that use of acknowledgment logs at 605 is optional, though useful. It is possible for a charging station to be provided with adequate memory and to operate under a policy to delete records that become older than some predetermined age. Another alternative is to only keep the most recent records, up to some predetermined number. Still another alternative is to keep the most recent records up to some maximum amount of memory. Yet another alternative would be to keep each record until it has been reported (at 607, below), at least a predetermined number of times. Still other strategies (including a mix of those mentioned) may be used to constrain the amount of memory and age of records represented by the log data (at 607, below).

At 606, the smart phone 132 provides to the charging station (e.g., 111) found at 604 the parking authorization certificate acquired at 602. The charging station may accept this certificate, provided the certificate can be trusted (e.g., again, as ensured by a valid digital signature from, or encryption by, a recognized authority). The transaction may be recorded in charger log 630 of charging station 111. In response to the presentation of a valid certificate, the charging station is enabled and may charge a connected vehicle.

At 607, while the smart phone 132 and charging station 111 are in communication, the charging station may send log data from charger log 630 to smart phone 132, which may further be digitally signed or encrypted by charging station 111. Note that this data is not erased from the charger log 630 at this time, but is kept until a future log acknowledgment permits the erasure, as discussed above in conjunction with 603. Smart phone 132 keeps this log data until it is transferred to server database 620 at 609.

At 608, vehicle 130 is connected to enabled charging station 111 and undergoes a charge while parked. Upon completion of the charge (or disconnection from vehicle 130), charger 111 may disable and may update charger log 630 with information regarding electricity usage, and other transactional (e.g., stop time) information. Other information may be logged in charger log 630, for example operational information (e.g., load shed events or access door open/close events, etc., which may be recorded as they occur), or environmental information (e.g., internal or external temperatures, which may be logged periodically, or when certain thresholds are exceeded).

At 609, which may occur before, while, or after charging station 111 charges vehicle 103, smart phone 609 communicates with server 305 to provide the log data received at 607 to server database 620.

Note that 606 & 607 could occur simultaneously, or in a different order, and that log data, as at 607, might be accepted from other charging stations, too, for example during the search at 604.

In some embodiments, as a matter of business policy, parking authorization certificates might be single use, or under a different policy, may be used more than once. Application 133 would be programmed to obey the policy, and an analysis of logs provided by charging stations and transferred to server database 620 through smart phone 132 could determine instances where the policy has been violated.

From the charging station point of view, access control and reporting process 600 looks like this: At 604, a charging station is contacted by a first smart phone. This first smart phone offers a first parking authorization certificate at 606, which the charging station accepts to create a first transaction and enable charging. The first transaction is logged in charger log 630, comprising at least data representing the first certificate, and may further comprise start time or other information. When charging 608 is complete, energy usage and/or total connection time may be appended to the record of the first transaction in charger log 630. At 607, a copy of log data from charger log 630, including data representing the first transaction, is provided to a second smart phone (which could be the first smart phone having returned at the end of the charging session, or a different one, for example presenting a certificate of its own) for delivery to parking management server 305. At 605, a log acknowledgment message may be received from a third smart phone, the message indicating that log records from the charging station representing at least the first transaction have been reported to the parking management server 305 and no longer need be retained, in response to which the data representing the first transaction in charger log 630 is deleted.

Note that what is here referred to as the third smart phone, may be the first smart phone: For example, after having initiated charging, the patron with the first smart phone returns, having parked and charged for some time. While he disconnects his vehicle from charging station 111, the first smart phone might be engaged in live, wireless connections with both server 305 and charging station 111 at approximately the same time, for example while the vehicle is being disconnected from cable 112, and thereby providing contemporaneous log transfer (in the role of second smart phone) and acknowledgment (in the role of third smart phone); or in a different example, the first smart phone might be returning the following day with a new certificate for presentation, but also bearing a log acknowledgment (in the role of third smart phone) for a log delivered to the server yesterday, by the second smart phone. Further note, that over multiple interactions, log data representing the same transaction records may be provided on more than one occasion and thus to more than one smart phone, because until a log acknowledgment message is received at 605 (or other criteria is met, according to policy, as discussed above with respect to alternative to 605), charging station 111 will repeatedly attempt to transmit log data to parking management server 305. The redundancies of repeated reporting are handled at the server 305 or in database 620 (some examples of this are seen in the discussion regarding FIG. 9).

In an underground parking structure, having little or no wireless communication with server 305, charging station would be found by a first smart phone at 604, accept a certificate from it at 606, and offer charging at 608, which would be noted in a first transaction record in charger log 630. Later, after charging, 608 is complete and the first smart phone has departed, the charging station connects with a second smart phone to which is provided a log message, including the first transaction record at 607. That second smart phone and log message are transported out of the underground parking structure, where communication with server 305 is available, and the log is transferred to server database 620. Still later, the charging station connects with third (different) smart phone that had received a log acknowledgment message from server 305 at 603, which is provided to the charging station at 605, which permits the deletion of the first transaction record from log 630.

From the foregoing, though somewhat dependent upon implementation, it will usually be the case that at least two of the first, second, and third smart phones (wireless, mobile computing devices) will be distinct devices, and often the case that all three will be distinct.

FIGS. 7A and 7B show example embodiments of the parking authorization certificates provided by server 305 to smart phone 132 and later by smart phone 132 to charging station 111. Note that the example of these figures does not include any encapsulation, compression, or encryption that might be appropriate when embedding the certificate (or in discussions below, logs and log acknowledgments) in messages.

FIG. 7A shows a secure certificate 700 suitable for use in the transactions of FIG. 3, wherein a particular charging station "A" has been assigned. Opening and closing tags 701, 702 bound the certificate itself, which is in turn secured by the signature presented in 703. The signature 703 may be sufficient for an embodiment where the signing certificate and algorithm used by server 305 for the creation of secure certificate 700 is predetermined and known to the intended recipients, such as charging station 111. Alternative embodiments requiring more robustness might use the more versatile secure document signatures standardized in "XML Signature Syntax and Processing," by the World Wide Web Consortium, Cambridge, Mass., but is not used in these examples for brevity.

The certificate comprises the elements presented between tags 701, 702. Certificate identifier 710, in this example a UUID (universally unique identifier, a standard documented in ITU-T Rec. X.667), provides this certificate 700 with a unique ID, which can subsequently be used to identify this certification to the system (for example, in logs). This allows server 305 to track and report usage of this certificate from logs that may be generated and returned at a later time. Issue date element 711 represents the creation date of secure certificate 700 by server 305.

For use the transaction sequence 300, secure certificate 700 comprises a charger ID element 712, which limits applicability of this certificate to a specific charging station (111) having the identity of the UUID "11111111-1111-1111-1111-111111111111". As information for use by smart phone 132 during search phase 320 and the construction of "looking for A" messages 321, 322, 323, the charger communications identity element 713 provides the device address (e.g., BD_ADDR) associated with charging station 111. In this example, secure certificate 700 is valid and would be acceptable by charging station 111 between the dates and times specified in the elements reservation date 714, and reservation end date 715, i.e., from 8:15 PM on February 14th until four hours later.

Upon receipt of secure certificate 700 in message 331, charging station 111 can: a) compute the hash of the certificate portion from 701 to 702; b) decrypt the signature value 703 using the public key for server 305; and c) compare the results of a) and b). If they match, then the certificate may be trusted, whereas if they do not match, the certificate (or signature) has been accidentally damaged or deliberately altered and should not be trusted.

In some embodiments, the charger ID element 712 might be one of a list of charger ID elements (not shown) for which the secure certificate would be valid. A corresponding device address could be included for each. In still other embodiments, the device address 713 would fulfill the role of charger identity 712, and a separate charger identity 712 would not be provided. In still other embodiments, where charger identity 712 is provided and device address 713 is not provided, then the "looking for A" transactions 322 and 323 would comprise a general inquiry for any charger, where the recipient chargers reply with their charger identity, which is then compared to those listed in the certificate. A match represents an appropriate charging station being found.

FIG. 7B shows a different secure certificate 720, comprising the certificate from tag 721 to 722, and a corresponding signature 723 (operating as described above). As with secure certificate 700, secure certificate 720 has a unique identity 730, and an issue date 731. But rather than designating a specific charging station or reservation interval, secure certificate 720 comprises expiration date 732. Thus, secure certificate 720 is valid for any participating charging station from the time it was issued until three days later. Secure certificate 720 would be usable in transaction sequence 400, where search 420 does not require any specific charging station.

FIG. 8 shows an example secure log 800, comprising the log from tag 801 to 802, and the digital signature 803, as might have been provided to smart phone 123 as data pack D in message 334.

The identity of the charger providing secure log 800 is given at 811. The other data contained in this log will be associated with the indicated charging station when stored in server database 620. Upon receipt, the server 305 can use this identity to determine appropriate parameters for checking signature 803, such as the public key corresponding to the indicated charging station. This would also be used in an alternative embodiment where charging station 111 encrypted portions of the log.

The date and time upon which the log was created is provided in element 812. If server 305 has already accepted a log created at a later date, then this log may be superfluous and might be ignored.

The log may indicate one or more previously received log acknowledgments with corresponding elements 813, in which a unique identifier 814 for the log acknowledgment is given (see discussion regarding FIGS. 10A, 10B), as is the date 815 on which the acknowledgment was received by charging station 111.

A status list starting at tag 820 and running to tag 829 may be included, within which each status entry, (only one shown for brevity) starting at tag 821, comprising the status date 822 and whatever environmental data might be desired, for example, the status 823 of an internal back-up battery or then-current internal temperature 824. Other status information citing minimums, maximums, totals, averages, or counts might be provided (none shown), for example the total hours charging station 111 was plugged into vehicles between the log date 812 and the most recent acknowledgment received date 815, or since the prior status entry (e.g., in embodiments where status elements 821 are created for each day).

An element for listing events starts at tag 830 and runs to tag 839. In this example, four event elements are shown starting at tags 840, 850, 860, and 870. Each has a corresponding sequence number 841, 851, 861, 871, and date 842, 852, 862, 872. The sequence numbers are used by server 305 when creating a log acknowledgment message, so that the charging station is informed, upon receipt, that all events up to and including a particular one have been successfully received by parking management server 305, need not be subsequently reported again, and so may be deleted from memory.

Here, events 840, 850, and 870 are events where parking authorization certificates having identities 843 (corresponding to secure certificate 700), 853 (corresponding to secure certificate 720), and 873 were accepted. Each vehicle connection lasted until the corresponding stop date 844, 854, 874, and consumed the electrical power known to the charging station and reported at 845, 855, 875. From this information, server 305 can determine which certificates were used, when, the duration of parking (assuming the vehicle remained plugged in throughout its stay in the parking place 110), and the energy consumed; which when joined with the information already associated with the certificates, is sufficient to properly debit or bill the associated accounts and/or otherwise track and report on usage.

Event element 860 is an exception to the above, where for thirty minutes from 862 to 864, charging station 111 was directed to shed load 863, during which interval, no vehicle charging would have occurred. Since this thirty-minute interval is entirely within the span of event 850, depending upon business policy, there may or may not be an adjustment to that transaction. In some embodiments, the load-shed event might be represented in the log within concurrent event 850, and split as needed where the load-shed event is only partially concurrent with other events (neither case shown).

As a matter of business policy, how a charging station should behave if the number of log entries (status and events) would exceed available memory may include priorities, for example, that might first delete certain data from status entries (e.g., battery status 823), or whole status entries (e.g., 821), to deleting certain events (e.g., load shed events 860), events older than a predetermined age (e.g., three months), event details (e.g., power usage 845), and so on. Though considering the low cost of memory and the availability of compression and encoding technologies, such log pruning behavior is unlikely to be used. In extreme cases, a critical log size in a charging station might be observed or anticipated by server 305, and a maintenance operator dispatched specifically to collect the current log and subsequently provide a log acknowledgment.

Figure 9:
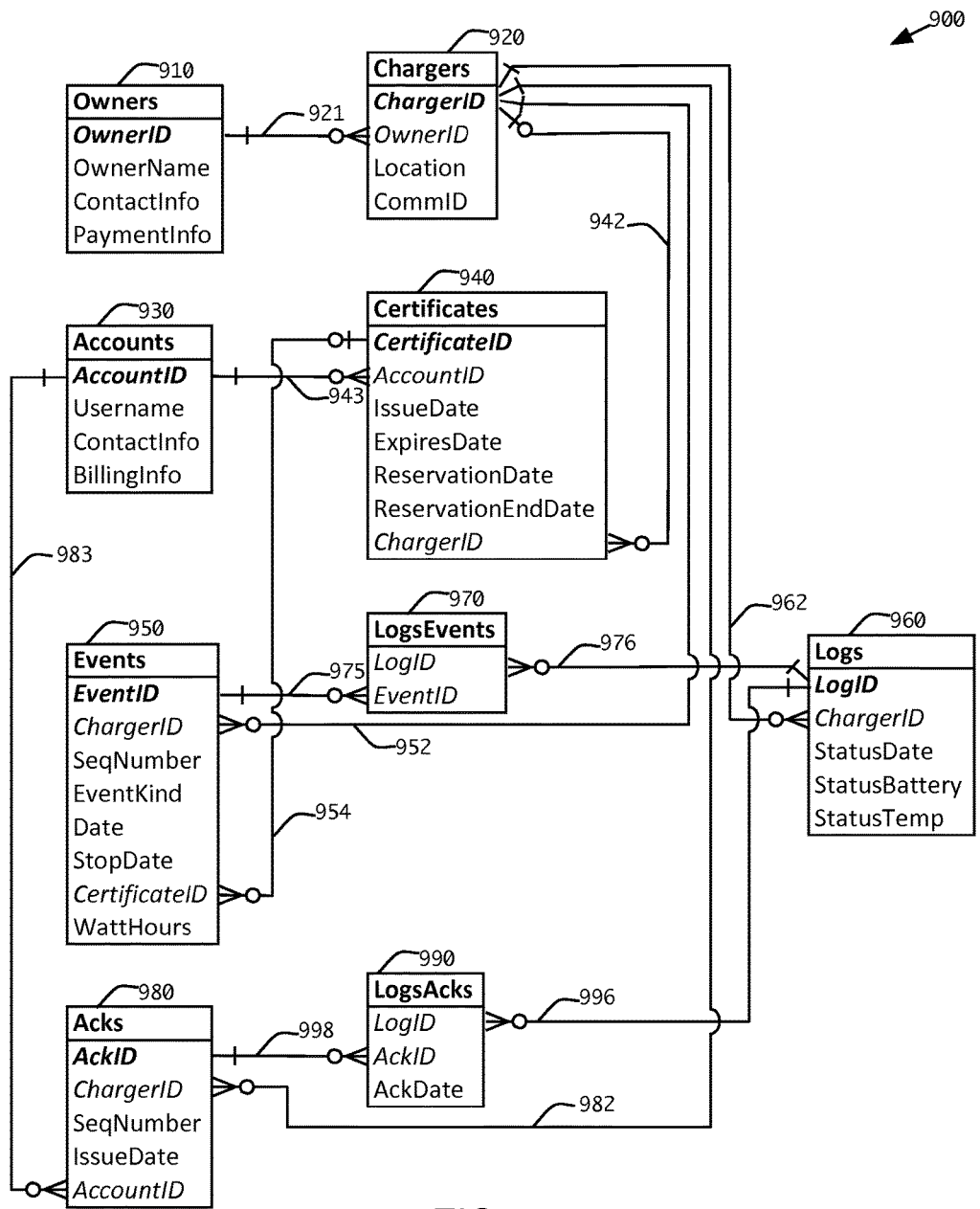
FIG. 9 is an example schema for a database suitable for tracking use of the charging stations as reported in log files.

One example schema 900 suitable for implementing server database 620 is shown in FIG. 9. Schema 900 comprises owners table 910, which lists entities that own participating charging stations; chargers table 920, which lists the charging stations served by parking management server 305; accounts table 930, which lists all the patrons participating in the system; certificates table 940, which tracks all the parking authorization certificates issued; events table 950, which are those events returned in logs; logs table 960, which represents the logs returned, less the events they contained; log-events linking table 970, which associates each event record in events table 950 with the one or more log records in log table 960; acks table 980, which lists each log acknowledgment created; and logs-acks linking table 990, which associates acknowledgment records in acks table 980 with each log record in table 960 that reported having received the log acknowledgment.

In other schema embodiments, different organizations of the data may be selected, for example, to break out status entries from the records in logs table 960 as are event records in table 950, if such was needed to better analyze and report on daily or hourly status data (none shown) that was being collected.

In owners table 910, each record provides business information such as the owner's name, contact information, and payment information. This allows the parking management system comprising server 305 to compute and transfer payments as appropriate to the owners, for parking and charging that takes place involving their chargers. It also provides information necessary to contact the owners if other issues arise (e.g., maintenance needed) with their charging station.

Each record in chargers table 920 contains a unique identifier for the charging station (e.g., as may be used in the charger identification element 712 in certificate 700, and elsewhere). The location of the charger is also recorded, for example to provide map coordinates to a patron looking for a charging station (which might also have been included in secure certificate 700), as is the communication identifier (e.g., device address/BD_ADDR), included in the certificate as element 713. Each charger has exactly one owner, as shown with 'owns' relationship 921, though each owner may own multiple charging stations.

Accounts table 930 has for each record a unique account identifier, username, contact information, and billing information (which may describe a prepaid account, which subscription plan the patron has selected, credit card billing preferences, etc., according to business needs and policies).

Certificates table 940 generates a record for each parking authorization certificate made, which includes the unique certificate identifier (e.g., 712). The account ID for which the certificate is made is also recorded, thereby creating 'for account' relationship 943, since each certificate is made on the request from a patron. The other information recorded is also found in the various kinds of certificates: issue date (711, 731), expires date (732), reservation date (714), reservation end date (715), and charger ID (712). Note that not all fields are used in every kind of certificate, in which case the field in the record may be set to null. When present, the charger ID field forms 'for charging station' relationship 942.

Embodiments of the present invention should comply with Article 625 of the National Electrical Code, and if used to support an electric vehicle feeding energy back into the electric grid, then embodiments should further comply with Article 705.

Events reported in logs are parsed into records in events table 950. Each event record may be given a unique event ID for use in the database (as shown), or the fields corresponding to the log's charger ID (811) and event's sequence number (e.g., 841) may be used together as a composite key for the table (though not used here). The "event kind" field would differentiate between parking events and load shed events, as shown in log 800. Other kinds of events may include power failure, maintenance, access (e.g., door open/door closed), etc. In some alternative embodiments, the status elements in list element 820 might be logged, provided, and recorded as events having their own corresponding event kinds instead of being treated separately. The charger ID field creates charger-event relationship 952, so that the history of activities for a charger is easily accessible. For those events involving a certificate (e.g., event 840 involves certificate 843), the population of the certificate ID field creates 'used' relationship 954, which may represent a billable event.

As shown, log records in table 960 are provided with a unique identifier for use in database 620, though in other embodiments, a composite key made up of the charger ID (from 811) and log date (from 812) could be used (though not here). The charger ID field provides 'log from' relationship 962, and the records in linking table 970 provide the many-to-many relationship comprising 975, 976 that records in which logs which events were reported (since an individual event might be reported multiple times). Log records in table 960 might include an additional field for account ID (not shown) to maintain a record of which patrons had carried which logs.

Log acknowledgments that are generated are recorded as records in 980, each having a unique ID as used in 814, 1010, and 1030, though in embodiments in which a single log acknowledgment message (e.g., 1020) having a single acknowledgment ID 1030 may reference multiple charging stations (1041, 1051, 1061), the full key for table 980 would be the compound key formed of the acknowledgment ID and charger ID fields. Charger ID also forms the 'log ack for' relationship 982. If each acknowledgment message is specifically generated when a certificate is being requested, then a relationship 983 may be maintained by recording the account ID field to allow statistics to be tracked for how well log acknowledgments are being transported into what areas and by whom, which may allow optimizations when later log acknowledgments are being provided by server 305.

Log acknowledgments received is a many-to-many relationship maintained by the records in table 990 each associating a log acknowledgment record (via 998, which may use the compound key discussed above) with a log (via 996) indicating not only that the log acknowledgment was received, but recording when (815), in the acknowledgment date field. These records are also useful for statistical analysis, when gauging how best to provide charging stations with log acknowledgments, and how long that is likely to take.

FIG. 10A show one example form for secure log acknowledgment 1000, while FIG. 10B shows another secure log acknowledgment 1020. Each provides the log acknowledgment from tags 1001, 1021 to 1002, 1022 and a secure signature 1003, 1023, all respectively. Each also has a unique acknowledgment ID 1010, 1030 and issue date 1011, 1031. However, the first, in FIG. 10A, contains a log acknowledgment for only one charger 1012, and indicates the last sequence number 1013 received as of the issue date 1011. In contrast, the second log acknowledgment, in FIG. 10B, contains a list from 1032 to 1033 of individual acknowledgments 1040, 1050, 1060, each calling out a different charger 1041, 1051, 1061 with corresponding last-received log sequence numbers 1042, 1052, 1062, all respectively. The former would only be delivered to the particular charging station identified at 1010, as done in message 333. The latter could be used for delivery to ANY of the charging stations listed therein, thus the single secure log acknowledgment 1020 might be used in each of messages 426, 427 (assuming that the ID for charger B is one of 1051, 1061). It would also be the case that two log acknowledgments of the type shown in 1000, one for each of charging stations A and B, could be used for messages 426 and 427, respectively.

Figure 11:
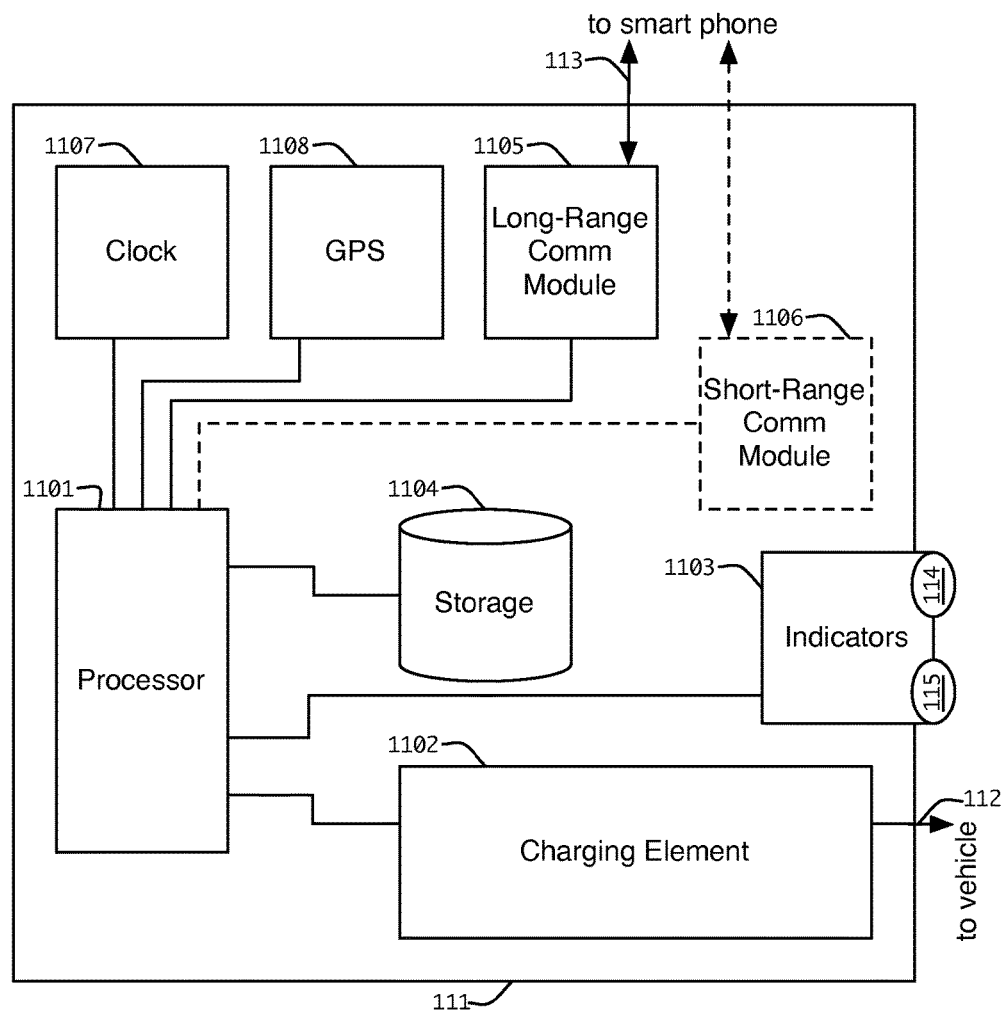

One example configuration for charging station 111 is shown in FIG. 11, where processor 1101 controls indicators 1103 (e.g., comprising lights 114, 115, but which may comprise a display screen, not shown), and charging element 1102, which may be connected to an electric vehicle with charging cable 112. Processor 1101 has access to storage 1104, which contains the software instructions for execution by the processor, and which provides storage for data, including event and status data to be retained until successfully transferred (e.g., via smart phone 132) to server 305 through logs (e.g. 800) and subsequently acknowledged (e.g., by log acknowledgment 1000). Processor 1101 can communicate with external devices, for example smart phone 132, by long-range communications module 1105 (where 'long-range' may be several meters to substantial portions of a mile, e.g., Bluetooth®, Wi-Fi).

In some embodiments, short-range communication module 1106 may be provided, where 'short-range' is a distance sufficiently small for it to not be ambiguous which charging station is conducting the transaction. Examples of short-range communication may be NFC, IrDA (as standardized by the Infrared Data Association). So choices, e.g., NFC, would not necessarily require connection to processor 1101, for example if an NFC tag is merely providing the device address for this charging station's long-range communication module (as discussed above).

In other embodiments requiring ambiguity (caused by overlapping long-range communication ranges of multiple charging stations) to be resolved, a barcode or QR code (not shown) may be presented on or near charging station 111 that identifies the correct device address, passcode, etc. that would disambiguate the long-range communications.

In other embodiments, the NFC tag may be located in the connector of charging cable 112 and read by an NFC reader located near the charging port of the vehicle. In an alternative embodiment, a similar identification to disambiguate the long-range communication may be provided by wired communication through cable 112.

In still other embodiments, especially those making use of a dashboard appliance in vehicle 130 (which may be built-in), to participate in the transactions described in place of smart phone 132, communication with charging station 111 may be wholly or partially through charging cable 112. In such embodiments, long-range communication module 1105 and antenna 113 may be unnecessary, unless communication is desired other than when vehicle 103 is plugged into charger 111.

Charging station 111 maintains an internal clock 1107 for use in evaluating validity of certificates by checking for valid reservation intervals (e.g., 714-715) or expiration dates (e.g., 732), and for time stamping status and event entries recorded in storage 1104 and later compiled into secure logs (e.g. 800). If a charging station has access to global positioning satellite signals, even only occasionally, then GPS device 1108 can be used to accurately set clock 1107. In other circumstances, processor 1101 may transact with one or more external devices (e.g., smart phone 132, or dashboard appliance) to determine maintain the current time on clock 1107, though generally, more than one interaction with different devices would be used to ensure a more accurate time setting.

In some embodiments, charging stations may have a communication module (whether 1105 or another long-range communication module not shown) to permit charging stations sufficiently near each other to exchange information. For example, stations 111 and 121 might exchange log information, such that each can deliver not only their own log, but also the log(s) of their neighbors (e.g., in data pack D at 334). Communication between proximal charging stations might be wired, or may be wireless, for example using BlueTooth®, or Wi-Fi, ZigBee® (a wireless technology standardized and promoted by the ZigBee Alliance of San Ramon, Calif.), the latter two having a nominal range of up to 100 m. Such inter-station communication is also useful with multi-station log acknowledgment 1020, as a single receiving station could re-distribute the document to other stations. For example, in FIG. 4, the multi-station log acknowledgment message received at 413 is provided to station 111 at 426 from smart phone 132, and could be forwarded to station 121 as message 428, which could occur in lieu of transfer 427, or in addition to it. Station 121 might then forward the message to other nearby stations (not shown). In such a case, the system still relies on smart phone 132 to transfer the log acknowledgment message to the charging stations (e.g., 121), even if the delivery flows indirectly through another charging station (111).

A similar efficiency with respect to log messages may be obtained where intercommunicating charging stations exchange log messages (e.g., 438) with each other. Thus, when data pack E from charger A is provided as message 435, it might include not only the current log from charger A (111), but also a log from station B (121), previously transferred via message 438. The log from station B may be aged; depending on how often exchanges such as 438 take place).

In some embodiments of application 133, access to data provided from diagnostic systems of vehicle 130 may be provided (not shown). An example mechanism for this is to use the on-board diagnostic port (OBD port) with a BlueTooth® adapter such as those using the ELM 327 chip designed and marketed by Elm Electronics of London, Ontario, Canada. The OBD port is standardized by the Society of Automotive Engineers in SAE J1978 February 1998 and ISO/DIS 15031-4 and their associated documents. This provides a standard way to access certain vehicle-related information, such as the VIN (vehicle identification number) and in some vehicles, the odometer. In such an embodiment, when a parking request (e.g., 311, 411, 511) is further made in the context of a managed vehicle fleet, then application 133 on smart phone 132 may obtain vehicle data accessed from the OBD, e.g., the VIN and/or odometer. Such information may be presented with the certificate request and tracked by server database 620, and may be included with the presentation of the certificate B (e.g., 331, 433, 531) to the charging station for later incorporation into logs, for example by inclusion in the corresponding events (such as 840, though no fleet information or VIN/odometer data is shown). Such mechanisms may help to minimize fraud, since the VIN could be registered in parking management database 620 as being associated with a fleet (not shown), and the odometer readings need to behave reasonably between transactions, that is, progressing monotonically, and rising in approximate proportion to energy expended, including fuel consumed.

The application 133 may further include an option to accept feedback from patron 130 with respect to the current condition of one or more charging stations, with such feedback being sent to server 305. An example use of such a capability would be to allow a patron to alert the charging station management that there is a safety hazard (e.g., frayed cable, damaged connector, poor lighting), or other complaint regarding a particular charging station.

For any additional data services (e.g., OBD data, customer complaints) communication with the charging station may provide one other service, that of authentication. For example, if at 331 a certificate is presented to station 111 along with OBD information, the acknowledgment 332 or receipt 343 could include the same OBD information, but with a secure signature (not shown). Thus, application 133 would obtain an authenticated record linking the then-current OBD data to use of the certificate on station 111. Such information would be included when later in communication with server 305 (e.g., message 352).

In some embodiments, the provision (e.g., 313) and presentation (e.g., 333) of a log acknowledgment may be further accompanied by data (not shown) for the charging station comprising a software upgrade or an update to a database. Once provided, the authenticity of the upgrade/update would be validated, and installation would proceed according to policy. Such updates could also be spread to other nearby charging stations if they are independently in communication with each other. If software updates are particularly large, they might be distributed in smaller chunks, such that the update would be received in individual pieces, but would not be installed until all pieces had been delivered. This would be used to prevent excessive transfer times when smart phone 132 is transferring the update to the charging station. Status entries in log 800 might be added to indicate which portions of a particular update had been received or which updates had been installed (none shown), which would allow server 305 to better manage such distributions.

In messages containing the logs, certificates, log acknowledgments, auxiliary data (e.g., ODB information), software updates, etc., the contents may be encrypted, as previously discussed. Further, the contents may be padded to obscure nature of the contents. In this way, transfer of a certificate with or without a software update, or a log acknowledgment for one (1000) or many (1020) chargers, might be externally indistinguishable. This could be further extended to include dummy logs or dummy log acknowledgments, so that each request 311 is always provided with a log acknowledgment 313 (whether or not a dummy), and obtains from charging station 111 a data pack 344 (whether or not a dummy), for use in measuring the statistical efficacy of smart phone 132, application 133, and patron 130 in transferring messages.

Various additional modifications of the described embodiments of the invention specifically illustrated and described herein will be apparent to those skilled in the art, particularly in light of the teachings of this invention. It is intended that the invention cover all modifications and embodiments, which fall within the spirit and scope of the invention. Thus, while preferred embodiments of the present invention have been disclosed, it will be appreciated that it is not limited thereto but may be otherwise embodied within the scope of the following claims.

We claim:

1. A method for the control of dispensing, as of fuel or electrical energy, to vehicles, the method comprising:
   a) accepting a first data, with a first station, from a first mobile computing device of a first patron, the first data representative of at least a certificate, the certificate created by a management system and representing an authorization for dispensing;
   b) dispensing to a vehicle, with the first station, in response to the first data;
   c) making a record in a memory of the first station, the record comprising a second data representing the dispensing and at least an identifying portion of the certificate;
   d) providing a third data, by the first station, to a second mobile computing device of any patron, the third data deliverable by the second mobile computing device to the management system, the third data representative of the record;
   e) accepting a fourth data, with the first station, from a third mobile computing device of any patron, the fourth data representative of at least an acknowledgment of the record, the acknowledgment created by the management system and representing receipt by the management system of the third data, wherein e) accepting fourth data is further through a second station and the first station has communication with the second station; and,
   f) deleting the record from the memory, in response to the fourth data.

2. A first station, for dispensing fuel or electricity to vehicles, comprising:
   a processor;
   a communication module connected to the processor to provide communication with mobile computing devices;
   a dispensing element, controllably enabled by the processor, for dispensing at least one of fuel and electricity; and, a memory accessible to the processor, the memory containing executable instructions, which when executed by the processor perform a process of:
  a) accepting a first data, through the communication module, from a first mobile computing device of a first patron, the first data representative of at least a certificate, the certificate created by a management system and representing an authorization for dispensing;
  b) dispensing to a vehicle, with the dispensing element, in response to the first data;
  c) making a record in the memory, the record comprising a second data representing the dispensing and at least a portion of the certificate;
  d) providing a third data, through the communication module, to a second mobile computing device of any patron, the third data deliverable by the second mobile computing device to the management system, the third data representative of the record;
  e) accepting a fourth data, through the communication module, from a third mobile computing device of any patron, the fourth data representative of at least an acknowledgment of the record, the acknowledgment created by the management system and representing receipt by the management system of the third data, wherein e) accepting fourth data is further through a second station and the communication module has communication with the second station; and,
  f) deleting the record from the memory, in response to the fourth data.

* * * * *